April 13, 1965 A. V. LOEWIS OF MENAR 3,178,167
SUSPENSION FOR VEHICLES OR THE LIKE
Filed Dec. 21, 1962 7 Sheets-Sheet 1

INVENTOR
Alexander v. Loewis
of Menar by
Michael J. Striker

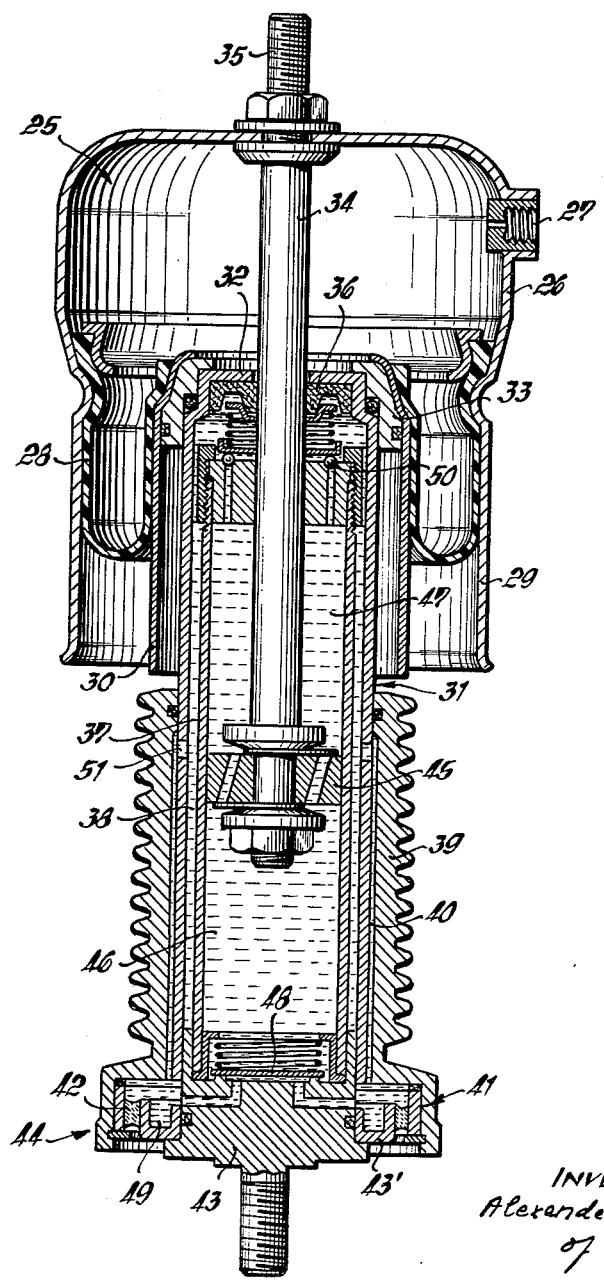

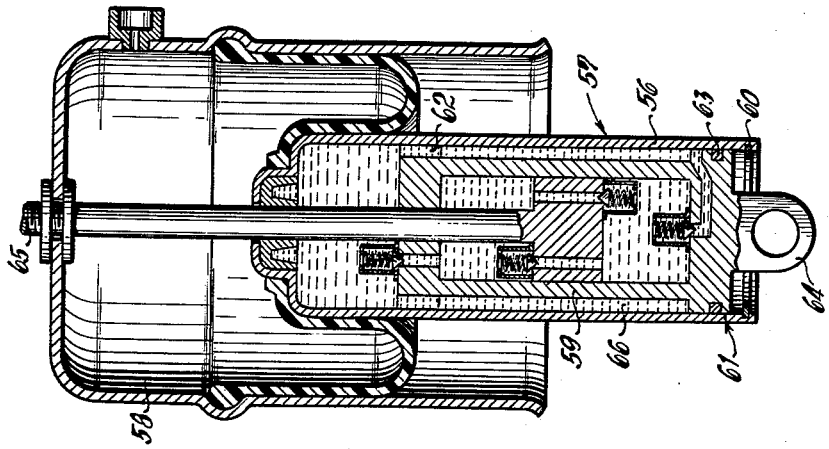

April 13, 1965    A. V. LOEWIS OF MENAR    3,178,167
SUSPENSION FOR VEHICLES OR THE LIKE
Filed Dec. 21, 1962    7 Sheets-Sheet 4
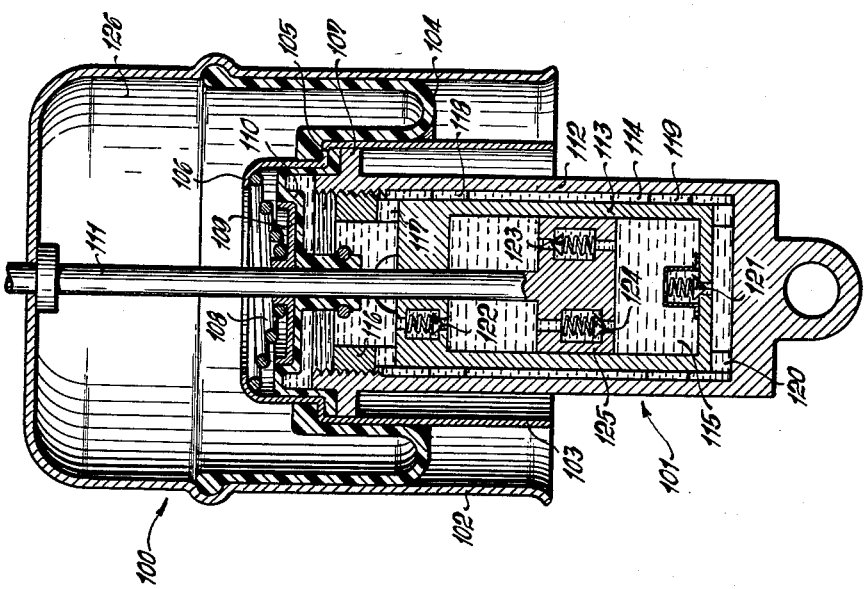
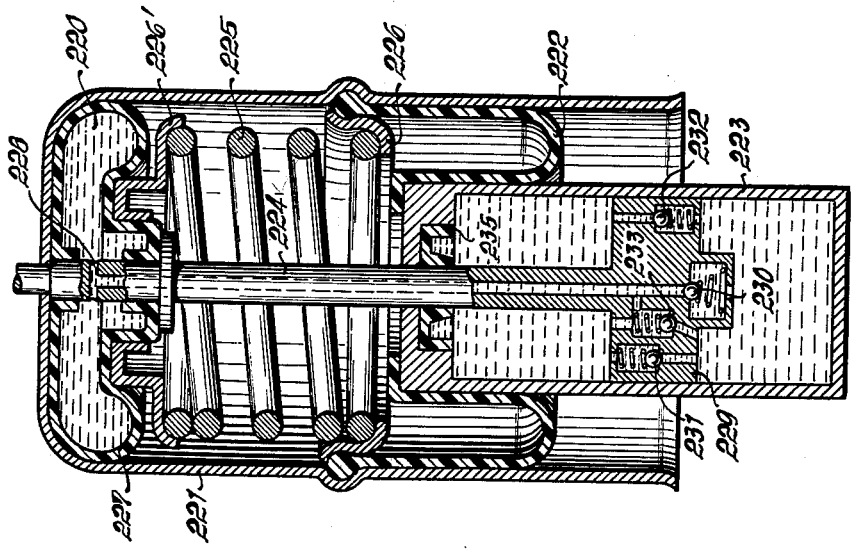
INVENTOR
Alexander von Loewis
of Menar
by Michael J. Striker

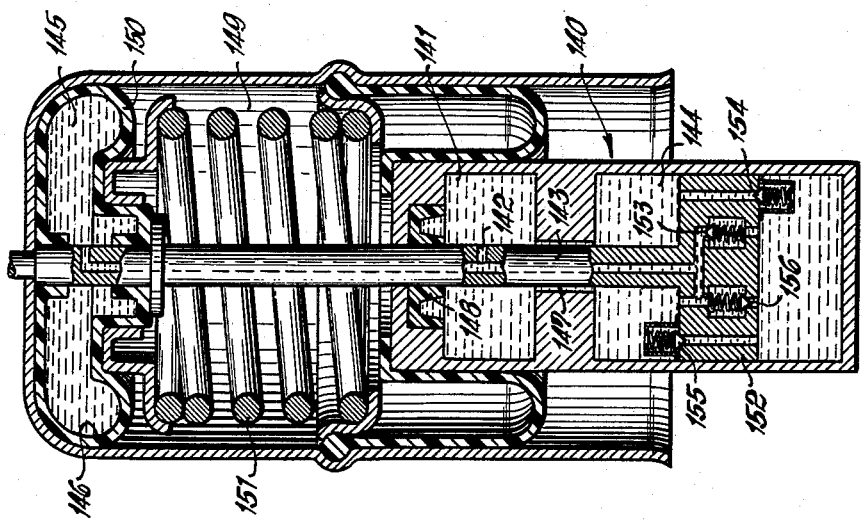
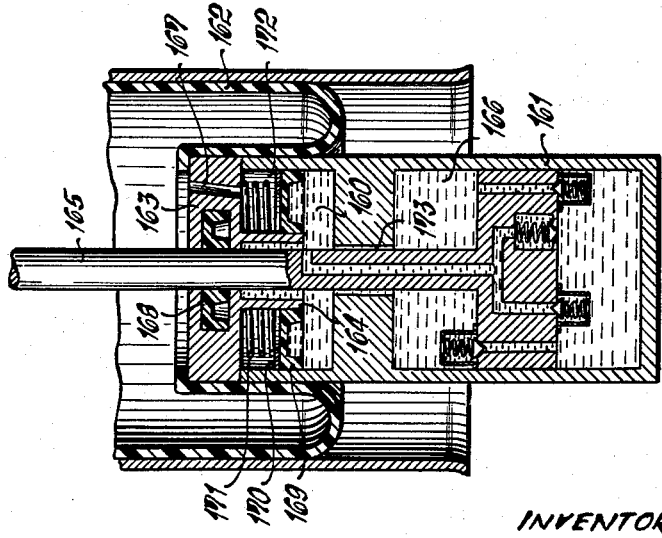

April 13, 1965   A. V. LOEWIS OF MENAR   3,178,167
SUSPENSION FOR VEHICLES OR THE LIKE
Filed Dec. 21, 1962   7 Sheets-Sheet 6

INVENTOR
Alexander V. Loewis of
Menar by Michael S. Striker

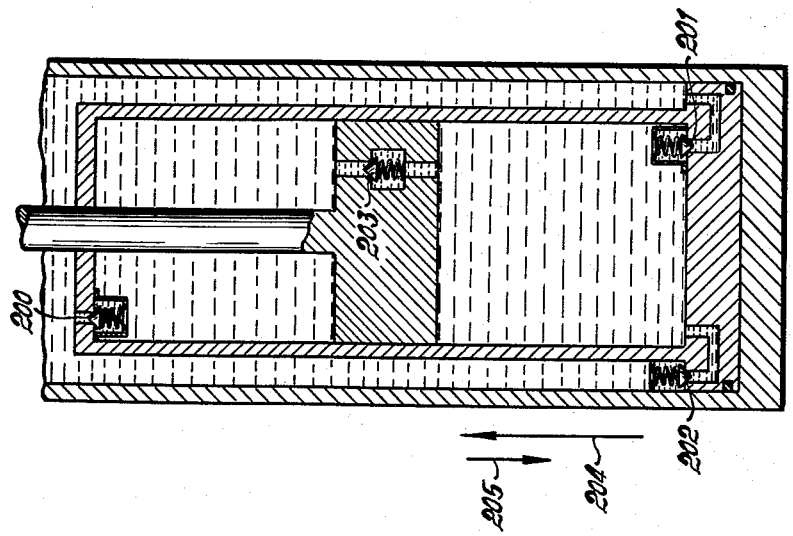
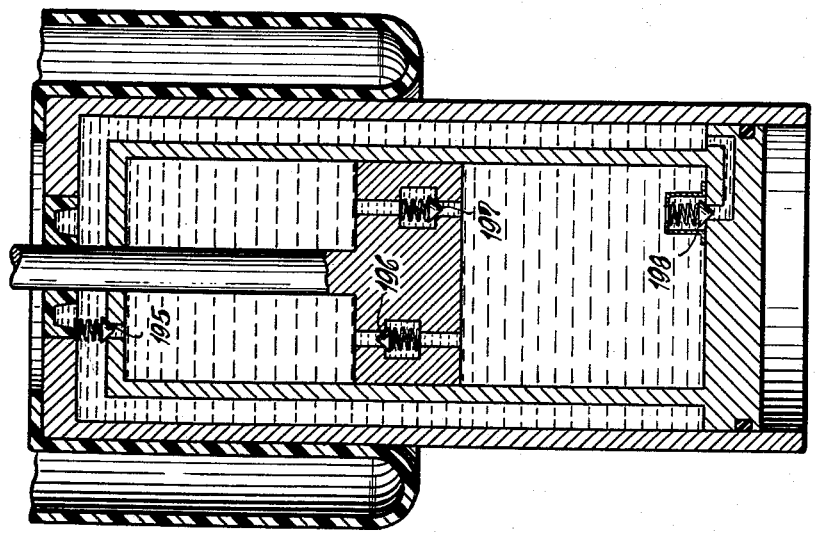

United States Patent Office 3,178,167
Patented Apr. 13, 1965

3,178,167
SUSPENSION FOR VEHICLES OR THE LIKE
Alexander v. Loewis of Menar, Mauren Gde, Ehningen, Kreis Boeblingen, Germany, assignor to Robert Bosch G.m.b.H., Stuttgart, Germany
Filed Dec. 21, 1962, Ser. No. 246,507
Claims priority, application Germany, Dec. 30, 1961, B 65,386
10 Claims. (Cl. 267—64)

The present invention relates to suspensions for vehicles or the like.

Suspensions of this type generally include a shock absorber assembly as well as a structure for transmitting to the shock absorber assembly the load which is to be carried by the suspension. The shock absorber assembly generally includes a cylinder and a piston slidable therein, and during movement of the body and axle of a vehicle toward and away from each other the piston and cylinder will slide one with respect to the other, and it is important to be able to maintain the chambers of the cylinder filled with liquid since otherwise cavitation occurs. Moreover, where the structure includes not only hydraulic structure but also pneumatic structure, there will be the creation of undesirable foaming where the hydraulic liquid is exposed to a gas, and such foaming also is highly undesirable.

It is accordingly a primary object of the present invention to provide a suspension of the above type which will reliably prevent any cavitation in the hydraulic structure.

Another object of the present invention is to provide a structure of the above type which will on the one hand prevent cavitation and will on the other hand prevent any foaming of the hydraulic liquid.

A still further object of the present invention is to provide a suspension which is compact and easy to mount properly between the axle and body of the vehicle so as to support the body on the axle.

Also, it is an object of the invention to provide a structure of the above type which will reliably maintain fluid-tight seals wherever required.

Furthermore, it is an object of the present invention to provide a suspension which can easily be adapted to the particular load which it is required to support.

An additional object of the present invention is to provide a suspension structure which is simple and rugged and highly reliable in operation.

With the above objects in view the invention includes, in a suspension for vehicles or the like, a hydraulic shock absorber means which includes a cylinder and a piston slidable therein and having a pair of opposed faces one of which is of a larger area than the other, the piston face which is of larger area defining a cylinder chamber with the cylinder. A non-return valve means communicates with this cylinder chamber to admit liquid into the same during an increase in the volume thereof, and a loading assembly is operatively connected to the shock absorber means for transferring thereto the load which is to be supported by the suspension. This loading assembly includes a hydraulic expandable and compressible means defining a hydraulic chamber which is maintained under pressure by the loading assembly and which communicates through the non-return valve means with the above-mentioned cylinder chamber so as to automatically deliver liquid thereto during an increase in the volume thereof, and thus prevent cavitation therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a sectional elevation of a suspension according to the present invention, the loading assembly of the embodiment of FIG. 2 being coaxial with the shock absorber means;

FIG. 3 shows an embodiment of a suspension according to the present invention which is similar to that of FIG. 2 but which is simpler than that of FIG. 2;

FIG. 4 shows a suspension according to the invention in which a coil spring of the suspension surrounds the shock absorber;

FIG. 5 is a diagrammatic sectional illustration of an embodiment of a suspension according to the invention in which the loading assembly is also coaxial with the shock absorber;

FIG. 6 shows a still further embodiment of the invention wherein all of the components are coaxially arranged;

FIG. 7 shows a suspension which is similar to that of FIG. 6 but in which the cylinder of the shock absorber has a special additional chamber therein;

FIG. 8 shows an arrangement similar to that of FIG. 7 but in which part of the loading assembly is located directly in the interior of the additional chamber of the cylinder of the shock absorber;

FIG. 11 schematically illustrates one form of valve arrangement which can be used with the structure of the invention; and FIG. 12 shows another form of a valve arrangement which can be used with the structure of the invention.

Figure 1:
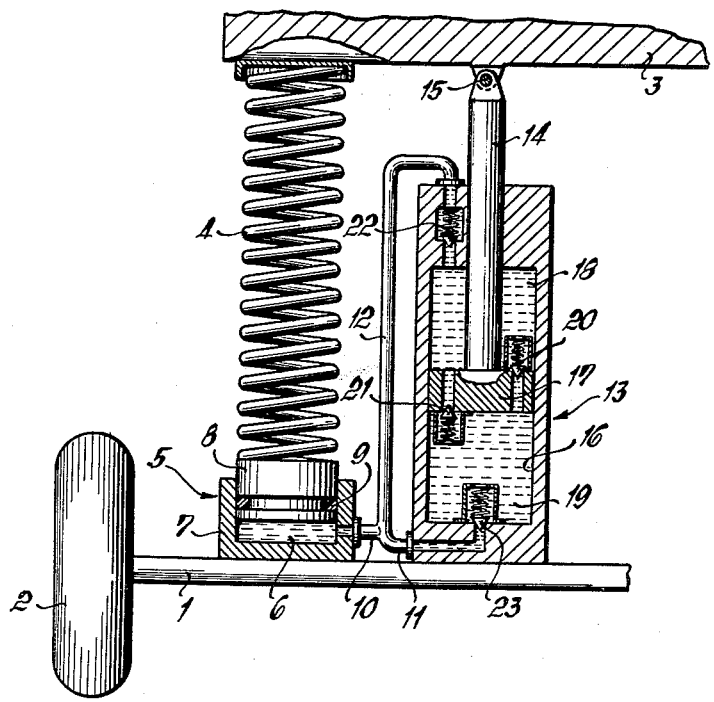
FIG. 1 is a partly sectional, diagrammatic illustration of one possible embodiment of a suspension according to the present invention, the suspension of FIG. 1 having a loading assembly which is separate from the hydraulic shock absorber means.

Referring now to FIG. 1, there is diagrammatically illustrated therein the axle 1 of a vehicle, this axle 1 being operatively connected to a wheel 2. The body 3 of the vehicle is located over the axle 1, and the suspension of the invention supports the body 3 on the axle 1. The suspension structure includes the elongated coil spring 4 which has its upper end connected to the underside of the body 3, and the lower end of the spring 4 does not have an operative connection directly with the axle 1. Instead, the lower end of the spring 4 acts on a hydraulic expandable and compressible means 5, the spring 4 and the expandable and compressible means 5 forming a loading assembly for transferring to the hydraulic shock absorber, described below, the load which is supported by the suspension structure. Thus, the spring 4 and expandable and compressible means 5 are arranged coaxially with respect to each other and between the axle 1 and the body 3. This expandable and compressible means 5 of the loading assembly includes a cylinder 6 which is directly connected to the axle 1 and which is defined by the housing 7, this cylinder 6 slidably receiving a piston 8 against which the bottom end of the spring 4 presses, and the piston 8 carries a sealing ring 9 which fluid-tightly engages the inner surface of the cylinder 6.

A conduit 10 communicates with the interior of the cylinder 6 and with a pair of branch conduits 11 and 12 which respectively lead to the shock absorber means 13 which is also arranged between the vehicle body 3 and the axle 1. This shock absorber means 13 is hydraulic, and the expandable and compressible means 5 also forms a hydraulic chamber, inasmuch as the interior of the cylinder 6 is at all times filled with hydraulic liquid, as pointed out below. The shock absorber means 13 includes the piston rod 14 which is pivotally connected at 15 to the vehicle body 3, and the cylinder of the shock absorber means 13 is connected at its bottom end directly to the axle 1. The cylinder 16 of the shock absorber means 13 slidably receives in its interior the piston 17 which is fixed at one side to the piston rod 14 which of course extends from the piston 17 through an end wall of the cylinder 16, as indicated in FIG. 1. Because the piston 17 is fixed at one side to the piston rod 14, the piston has a pair of opposed faces one of which has an effective area larger than the other, and the face of the piston 17 which is of larger effective area defines with the cylinder 16 a chamber 19. The piston rod 14 extends through a piston-rod chamber 18 which is located on the side of the piston 17 opposite from the chamber 19. As is indicated diagrammatically in FIG. 1, the piston 17 is formed with a pair of bores passing therethrough, and a pair of non-return, damping valves 20 and 21, having a predetermined prestress applied to their springs, cooperate with the pair of bores of the piston 17 in the manner shown at FIG. 1. Thus, during a decrease in the volume of the chamber 19 liquid will be capable of flowing through the damping valve 20 into the chamber 18, while during an increase in the volume of the chamber 19 liquid will be able to flow through the damping valve 21 from the chamber 18 into the chamber 19. Furthermore, a third damping valve 22, in the form of a non-return valve having a predetermined spring pressure communicates with the chamber 18, and this non-return valve 22 also communicates with the branch conduit 12, the arrangement being such that during a decrease in the volume of the chamber 18 liquid can also flow therefrom through the non-return, damping valve 22 into the conduit 12.

In addition, a non-return valve means 23 communicates with the chamber 19 as well as with the hydraulic chamber formed by the expandable and compressible means 5, and this non-return valve 23 is urged onto its seat by a relatively weak spring and communicates with the cylinder 6 through the conduit 10 and 11, as indicated in FIG. 1. Thus, during an increase in the volume of the chamber 19 liquid can flow into the latter through the non-return valve means 23.

During travel of the vehicle, the spring 4 will take up any jolts resulting from irregularities in the road surface, and the loading assembly 4, 5 will transfer the load to the shock absorber means 13 in which the energy of movement is converted into heat. The several damping valves 20–22 of the shock absorber means 13 are adjusted to yield in response to predetermined pressures which will provide the best possible shock absorbing action for the particular vehicle and the loads which it is designed to carry. Thus, the adjustments of the several damping valves 20–22, carried out in a manner well known in the art, adapts the structure to provide the desired damping. The piston 17 will of course move back and forth within the cylinder 16 and will displace fluid between the chambers 18 and 19. The largest part of the liquid will therefore flow through the damping valves 20 and 21 from one side of the piston 17 to the other side thereof, depending upon the direction of movement of the piston with respect to the cylinder 16. As a result of the spring pressure of the damping valves 20 and 21, the movement of the piston 17 and cylinder 16 one with respect to the other is retarded to provide the desired damping action. Of course, the loading assembly 4, 5 maintains the liquid in the cylinder 6 and thus the liquid in the shock absorber 13 under constant pressure. The expandable and compressible means 5 of the loading assembly is arranged between the axle 1 and the vehicle body 3 in such a way that the entire load which acts on the spring 4 is transmitted to the expandable and compressible means 5. The pressure which the piston 8 applies to the hydraulic liquid in the cylinder 6 acts through the conduits 10–12 on the liquid in the shock absorber 13, so that the load is transmitted to the shock absorber from the liquid in the hydraulic chamber formed by the expandable and compressible means 5. Thus, this expandable and compressible means 5 together with the spring 4 serve to transfer the load to the shock absorber both during movement of the body 3 and the axle 1 toward each other as well as during movement of the body 3 and the axle 1 away from each other.

Assuming that the body 3 and the axle 1 move toward each other, then of course the volume of the cylinder chamber 19 will become smaller and the volume of the piston-rod chamber 18 will become larger. The liquid displaced from the chamber 19 is capable of moving through the damping valve 20 into the chamber 18. However, since the chamber 18 is occupied by part of the piston rod 14, this chamber 18 is incapable of accommodating all of the liquid which is displaced from the chamber 19 which is free and unobstructed by any element such as a piston rod. Therefore, the part of the liquid displaced from the chamber 19 and in excess of that which can be accommodated by the chamber 18 will of necessity flow through the nonreturn valve 22 into the conduit 12 and of course from the latter through the conduit 10 into the expandable and compressible means 5, so that this latter means 5 serves to receive liquid in excess of that which can be received in the chamber 18 during a reduction of the volume of the chamber 19. Of course, it is to be noted that the valve 22 is under the pressure which prevails in the cylinder 6, so that it will not be possible for the valve 22 to open until the pressure of the liquid in the chamber 18 is greater than the pressure of the liquid in the cylinder 6. As a result, it is impossible for any cavitation to occur in the chamber 18 during an increase in the volume thereof.

Assuming now that the vehicle body 3 and the axle 1 move apart from each other, then the volume of the cylinder chamber 19 will increase while the volume of the chamber 18 will decrease. From the very beginning of the movement of the piston 17 and the cylinder 16 in a direction with respect to each other which increases the volume of the chamber 19, liquid flows into the latter through the non-return valve means 23 because of the relatively weak spring thereof, so that during an increase in the volume of the chamber 19 liquid will immediately be sucked into this chamber through the non-return valve means 23, and of course the fact that the expandable and compressible means 5 is always under the load of the spring 4 maintains in the hydraulic chamber formed by the means 5 a liquid pressure which is always high and which thus guarantees that liquid under high pressure will move through the valve 23 to the chamber 19 at the instant when the volume thereof increases. Because of the above-described arrangement of the expandable and compressible means 5 as well as of the valve 23, even during an increase in the volume of the chamber 19 the pressure of the liquid in the cylinder 6 will not reduce substantially, inasmuch as the axle 1 is fixed to the shock absorber 13 and thus guarantees that the spring 4 will remain under compression at all times. Thus, with this construction there will also be no possibility of cavitation occurring in the chamber 19 during an increase in the volume thereof.

Thus, with the structure of the invention the formation of foam in the hydraulic liquid is reliably prevented. Moreover, the expandable and compressible means 5 forms a separate unit which can easily be interchanged with another unit having a cylinder 6 and piston 8 of a different diameter so that in this way it is very easy to regulate the transmission of pressure from the spring 4 through the expandable and compressible means 5 to the hydraulic liquid of the shock absorber means 13.

Furthermore, it is to be noted that the sealing ring 9 of the piston 8 is always under pressure from the liquid in the cylinder 6, so that predetermined and precise pressure relationships can be provided with respect to the piston 8. With devices where a floating piston is located on a liquid between the liquid and a gas cushion on the other side of the floating piston, the piston is at the same pressure at both of its faces and with such a construction there are particular sealing problems which are avoided with a structure of the type shown in FIG. 1.

In the embodiment of the invention which is illustrated in FIG. 2, the loading assembly and the shock absorber means are coaxially arranged with respect to each other, and instead of a coil spring, the loading assembly is provided with a pneumatic expandable and compressible means. The entire suspension is mounted between an unillustrated vehicle body and an unillustrated axle. The pneumatic expandable and compressible means 25 of the loading assembly includes a housing 26 which is closed at its top and open at its bottom and is of a generally cylindrical configuration, as indicated in FIG. 2, and through a connection 27 the interior of the pneumatic means 25 is connected to a regulating valve which regulates the pressure within the pneumatic means 25 which defines a pneumatic chamber, as indicated in FIG. 2. Thus, the regulating valve may be in the form of an adjustable release valve which can be adjusted so as to prevent escape of a gas, such as air, from the pneumatic chamber unless the pressure exceeds a predetermined maximum limit. The compressed air or other suitable gas is originally located in the pneumatic means 25 at the desired pressure by connecting the pneumatic means with a suitable source of compressed air or other gas obtained, for example, from a suitable compressor. The pneumatic means 25 includes a flexible annular roll-sheet 28 which has inner and outer substantially cylindrical wall portions capable of moving axially one with respect to the other while the roll-sheet 28 is capable of rolling at its lower edge portion, so that in this way the interior of the pneumatic means 25 can change in volume. Thus, the outer wall portion of the sheet 28 is supported against the cylindrical wall portion 29 of the housing 26, and can roll against this cylindrical wall portion 29, and the inner wall portion of the sheet 28 is located against and can roll with respect to an inner cylindrical wall 30, the peripheral edge portions of the sheet 28 being respectively fixed to the walls 29 and 30 in the manner indicated in FIG. 2. It is to be noted that a substantial upper elongated portion of the shock absorber means 31 is surrounded by the walls 29 and 30 of the loading assembly, so that in this way the loading assembly also serves to protect the shock absorber means against foreign matter or other undesired influences. The end 32 of the shock absorber means 31 is fluid-tightly connected with a sleeve 33 to which the wall 30 is fixed. A piston rod 34 of the shock absorber means 31 extends completely through the pneumatic chamber formed by the pneumatic means 25, and at its end 35 the piston rod 34 is fixed with the top end of the housing 26, the end portion 35 of the piston rod 34 being suitably threaded to receive lock nuts, sealing members, and the like for the purpose of fixing the end portion 35 of the rod 34 to the housing 26 in a fluid-tight manner. This piston rod 34 extends through a sealing ring 36 which separates the liquid-filled shock absorber 31 from the gas-filled pneumatic means 25. The shock absorber means 31 is provided with an inner cylinder 37, and the exterior surface of the inner cylinder 37 defines the inner limit of an elongated annular chamber 38. A cylinder 39 provided with exterior cooling ribs surrounds the lower portion of the shock absorber means 31, and it will be noted that the outer limit of the annular chamber 38 is limited by the outer cylinder of the shock absorber means 31 while there is an additional annular chamber 40 between this outer cylinder and the ribbed cylinder 39. At its upper end the rib cylinder 39 is in fluid-tight engagement with the exterior of the outer cylinder of the shock absorber means 31, and at its lower end the ribbed cylinder 39 is enlarged so as to be provided with a lower cylindrical portion 41 of a larger diameter than the remainder of the ribbed cylinder 39. A flexible membrane 42 made of a suitable elastic material such as rubber or the like is located within the cylindrical portion 41 and fixed thereto as by being vulcanized therewith. The inner periphery of the flexible resilient member 42 is fixed, as by vulcanization, for example, to an annular channel member 43' which at its inner periphery is in fluid-tight engagement with a shiftable member 43 which forms the lower end wall of the cylinder of the shock absorber means 31 and which is adapted to be fixed to the axle of the vehicle or the like. Thus, the elastic ring 42 permits the member 43 and the ribbed cylinder 39 to shift axially one with respect to the other, and it is this construction together with the annular chambers 38 and 40 which forms the hydraulic expandable and compressible means of the loading assembly, this latter means defining hydraulic chamber whose volume is capable of changing and this chamber corresponds to the cylinder 6 of the embodiment of FIG. 1. The piston rod 34 is fixed at its lower end to a piston 45 slidable within the cylinder 37 of the shock absorber means 31 and dividing the interior of the cylinder 37 into a cylinder chamber 46 which is substantially free and unobstructed and a chamber 47 through which the piston rod 34 extends, as indicated in FIG. 2. A non-return valve means 48 is in communication with the cylinder chamber 46 and communicates through suitable bores with the expandable and compressible means 44, so that when the volume of the chamber 46 increases hydraulic liquid will be capable of flowing from the hydraulic chamber 49 formed by the means 44 through the valve 48 into the chamber 46 to prevent cavitation and foaming therein. The piston-rod chamber 47 of the cylinder 37 is connected through a pre-stressed non-return damping valve 50 with the annular chamber 38 of the expandable and compressible means 44. The outer cylindrical wall which defines the outer limit of the chamber 38 is formed with a plurality of openings 51 providing communication between the chambers 38 and 40. The piston 45 is formed with a pair of bores passing therethrough and respectively carrying a pair of oppositely directed damping valves corresponding to the valves 20 and 21 of FIG. 1 so that depending upon the direction of movement of the piston 45 with respect to the cylinder 37 the liquid in the cylinder 37 will be capable of flowing in one direction or the other between the chambers 47 and 46.

The pressure within the pneumatic means 25 is of course regulated so as to be adapted to the particular vehicle and the loads which it is designed to carry. The load of the suspension is of course transmitted from the pneumatic means 25 of the loading assembly to the hydraulic means 44 thereof, and through the expandable and compressible hydraulic means 44 the liquid of the hydraulic shock absorber means 31 is maintained under pressure. The sealing ring 36 is situated between the gas and liquid fluids in such a way that a greater pressure is applied to the ring 36 from the liquid than from the gas. Thus, it will be seen that the sealing ring 36 has the configuration of a channel member whose outer and inner walls form a pair of lips having directed toward the liquid much larger areas than directed toward the gas, so that the liquid acts through a much larger area on the sealing ring 36 than the gas and thus the liquid under pressure will reliably press the lips of the sealing ring 36 on the one hand against the piston rod 34 and on the other hand against the upper portion of the cylindrical side wall of the outer cylinder which defines the chamber 38, so that in this way reliable fluid-tight guiding of the piston rod 34 and separation of the gas and liquid is maintained. As was pointed out above, because a substantial portion of the shock absorber means is surrounded by the housing 26, the shock absorber means is in this way protected from dirt, flying stones, and the like. Of course, the action of the shock absorber means on the hydraulic liquid will heat the liquid, and as a result of the ribbed construction of the cylinder 39 this heat in the liquid is quickly dissipated to the outer atmosphere. It should be noted that the cylinder 37 is capable of shifting axially, together with the member 43 to which it is fixed, with respect to the outer cylinder which defines the outer limit of the chamber 38, this outer cylinder being fixed at its top end to the sleeve 33, as described above, and furthermore the ribbed cylinder 39 is capable of shifting axially with respect to the outer cylinder which it surrounds to define the chamber 40, as described above.

Assuming that the axle and body of the vehicle approach each other so as to reduce the volume of the chamber 46 of the cylinder 37 of the shock absorber means 31, then of course liquid will be displaced out of the chamber 46 through one of the non-return valves carried by the piston 45 into the chamber 47, but since the entire volume of liquid displaced from the chamber 46 cannot be accommodated in the chamber 47 because of the presence of the piston rod 34, therein, the excess liquid, when it reaches a sufficient pressure, will automatically move through the non-return damping valve 50 into the expandable and compressible hydraulic means 44 of the loading assembly. This liquid which passes through the valve 50 can of course move through grooves at the upper portion of the cylinder 37, at the exterior of the cylinder, into the chamber 38, and through the openings 51 into the chamber 40, and of course from the latter into the chamber 49, and due to the resilient member 42 it is possible for the structure to adjust itself so as to increase the volume of the hydraulic chamber 49 and thus automatically take up the excess liquid displaced from the chamber 46 which cannot be accommodated by the chamber 47, and because the liquid in the chamber 47 must have a certain pressure before it can open the valve 50, it is impossible for any cavitation or foaming to take place within the chamber 47.

Assuming that the operating conditions are such that the volume of the chamber 46 increases, then of course hydraulic liquid will be displaced from the chamber 47 into the chamber 46, and again because of the fact that the hydraulic liquid in the chamber 49 is always maintained at high pressure and because of the fact that the spring of the non-return valve means 48 is relatively weak, hydraulic fluid will immediately enter through the valve 48 into the chamber 46, so that in this way with this embodiment also there is no possibility of cavitation or foaming within the chamber 46.

FIG. 3 illustrates an embodiment of the invention which is similar to that of FIG. 2 but which is considerably simpler than the structure shown in FIG. 2. Referring to FIG. 3, it will be seen that the shock absorber means 57 includes an outer cylinder 56 which serves at the same time as a supporting wall for the flexible, annular roll-sheet which defines part of the expandable and compressible pneumatic means 58. The inner cylinder 59 is slidable within the cylinder 56 and defines an annular chamber therewith, as indicated in FIG. 3, this chamber communicating with the cylindrical chamber beneath the piston within the cylinder 59 through a non-return valve which is acted upon by a light spring, so that in this way the hydraulic chamber 66 of the loading assembly is in communication with the lower cylindrical chamber beneath the piston cylinder 59. A snap ring 60 is located in a groove at the inner lower portion of the cylinder 57 to prevent the cylinder 59 from moving downwardly out of the cylinder 57. The inner cylinder 59 has a lower flange 61 slidably engaging the inner surface of the cylinder 57, and an upper flange 62 also slidably engaging the inner surface of the cylinder 56 and formed with axial grooves passing therethrough so that in this way liquid in the cylinder 57 above the cylinder 59 can communicate through these grooves with the elongated space defined between the cylinders 56 and 59. The lower flange 61 is provided with a sealing ring 63, so that fluid-tight sliding engagement between the cylinders 56 and 59 is assured. The inner cylinder 59, which forms the cylinder of the shock absorber means, is fixed through a suitable fitting 64 with the axle of the vehicle, and the portion 65 of the piston rod which extends outwardly beyond the expandable and compressible pneumatic means 58 of the loading assembly is fixed in any suitable manner to the body of the vehicle. Thus, with this embodiment when the volume of the cylinder chamber beneath the piston in the cylinder 59 decreases, the liquid will be displaced therefrom into the piston-rod chamber of the cylinder 59, and excess liquid which cannot be accommodated in this latter chamber will move through the non-return damping valve at the upper wall of the cylinder 59 into the hydraulic expandable and compressible means 66 of the loading assembly, this means 66 forming in this way a hydraulic chamber capable of receiving the excess hydraulic liquid which cannot be accommodated in the piston-rod chamber, as described above, while when the volume of the cylinder chamber beneath the piston in the cylinder 39 increases, liquid will of course be displaced from the piston-rod chamber into this cylinder chamber and also from the hydraulic means 66 through the non-return valve at the bottom of the cylinder 59 into the lower cylinder chamber thereof, so that in this way the structure of FIG. 3 will also operate in the manner described above.

The embodiment of the invention which is illustrated in FIG. 4 is similar to that of FIG. 1 in that it includes a coil spring 70, but in the embodiment of FIG. 4 it will be noted that the coil spring 70 coaxially surrounds the shock absorber means. This shock absorber means includes the cylinder 72 which is located within and coaxially surrounded by the cylinder 73 which together with the cylinder 72 defines a hydraulic chamber 86 of the loading assembly, this chamber being expandable and compressible, and thus in this case also, the shock absorber means 71 serves to accommodate the expandable and compressible hydraulic means of the loading assembly. The outer cylinder 73 fixedly carries an annular support 74 for the lower end of the spring 70. The upper end of the spring 70 engages a washer 75 which is fixed to the piston rod 76 which is connected at its upper end to the body of the vehicle in any suitable way. The lower end 77 of the cylinder 72 of the shock absorber means 71 is fixed in any suitable way to the axle of the vehicle and is slidably received within the lower end of the outer cylinder 73, the lower end portion 77 of the cylinder 72 carrying a suitable sealing ring 78 so as to guarantee a fluid-tight slidable engagement between the cylinders 72 and 73. A flexible annular sealing member 79 engages at its outer periphery an inner flange 81 of the support member 74, and at its inner periphery the flexible sealing member 79 is snapped into an annular groove 82 which is formed in the bottom portion 77 of the cylinder 72, and this sealing member 79 will prevent dirt, pebbles, or other foreign matter from reaching the shock absorber means. A spring 80 is located within the lower portion of the cylinder 73 surrounding a reduced diameter portion of the member 77 and serving to press the outer periphery of the sealing member 79 against the flange 81, so as to maintain the sealing member 79 at all times in its operating position. It should be noted that the flange 81 also serves to retain the cylinder 72 within the cylinder 73. The cylindrical wall of the cylinder 72 is threadedly connected at its lower end to the end wall 77 thereof, as indicated in FIG. 4. This end wall 77 of the cylinder of the shock absorber means carries the non-return valve means 83 which is acted upon by a weak spring and which functions in the manner described above to admit hydraulic liquid into the cylinder chamber 87 under the conditions described above. It will be seen that the non-return valve means 83 communicates to the passages 84 and 85, formed in the end 77 of the cylinder 72, with the chamber 86 of the expandable and compressible hydraulic means of the loading assembly. The upper wall 88 of the cylinder 72 is threadedly fixed to the cylindrical wall of the cylinder 72 and is formed with the bore through which the piston rod 76 extends, and the upper wall 88 of the cylinder 72 has a slidable engagement with the inner cylindrical guiding surface 89 formed in the upper portion 90 of the outer cylinder 73, the upper portion 88 of the cylinder 72 being formed at its exterior with suitable axial grooves which provide for free communication between the space between the walls 88 and 90 and the chamber 86 between the cylindrical walls 72 and 73. The wall 88 of the shock absorber cylinder 72 is formed with axially extending bores 91 covered by a plate 92 which is pressed by a spring against the top surface of the wall 88, so that this construction forms a throttling type of non-return valve permitting fluid which cannot be accommodated in the piston-rod chamber of the cylinder 72 to flow out of this chamber into the expandable and compressible hydraulic means of the loading assembly. The top wall 90 of the outer cylinder 73 carries a sealing ring 93 which surrounds and slidably engages the piston rod 76, and it will be noted that this sealing ring 93 communicates at only a small portion of its exterior surface which surrounds the piston rod 76 with the outer atmosphere, while a relatively large portion of the inner area of the sealing ring 93, which has a channel-shaped cross section, is exposed to the liquid which is under pressure, so that the liquid will act with a far greater force on the sealing ring 93 than the outer air and will thus reliably maintain the sealing ring 93 in fluid-tight engagement with the piston rod 76 as well as with the upper wall 90 of the cylinder 73. The lower end of the piston rod 76 is of course fixed to the piston 94 which is slidable within the cylinder 72 and which is formed with a pair of axial, or substantially axial, bores which carry oppositely directed non-return damping valves serving to control the movement of the hydraulic liquid between the cylinder chamber 87 and the piston-rod chamber on the other side of the piston 94 within the cylinder 72, in the manner described above, during an increase or a decrease in the volume of the chamber 87.

Thus, with the construction of FIG. 4 the capability of the cylinder 72 of the shock absorber means to shift axially with respect to the outer cylinder 73 thereof provides the possibility of an increase or a decrease in the volume of the hydraulic chamber 86 of the expandable and compressible hydraulic means of the loading assembly, this expandable and compressible hydraulic means 95 being formed in this case also by the chambers between the cylinder of the shock absorber means and an outer cylinder surrounding the same. During a decrease in the volume of the cylinder chamber 87 the liquid which cannot be accommodated within the piston-rod chamber over the piston 94 will of course, when it reaches a predetermined pressure, move through the bores 91 and displace the valve plate 92 so as to enter into the space between the members 88 and 90, and this space of course communicates with the chamber 86, so that in this way the expandable and compressible means 95 is capable of accommodating the excess liquid which cannot be received in the piston-rod chamber of the cylinder 72, and on the other hand when the volume of the chamber 87 increases liquid will not only flow through the piston 94 into the chamber 87, but there will also be an immediate flow of liquid from the chamber 86 through the passages 85 and 84 and then through the non-return valve means 83 into the chamber 87, so that with this embodiment also there is no possibility of cavitation or foaming irrespective of whether the chamber 87 increases or decreases in volume.

In the embodiment of the invention which is illustrated in FIG. 5, the loading assembly includes an expandable and compressible pneumatic means 100 which is coaxially arranged with respect to the shock absorber means 101, and this shock absorber means is provided with inner and outer cylinders which define between themselves part of the space which forms the expandable and compressible hydraulic means of the loading assembly. The expandable and compressible pneumatic means 100 includes the outer housing 102 and the inner wall portion 103 to which the inner and outer wall portions of the flexible roll-sheet 104 are fixed and on which these inner and outer wall portions of the roll-sheet 104 are capable of rolling, in the manner described above, during a change in the volume of the pneumatic chamber formed by the pneumatic means 100, the pressure of the air or other gas in this pneumatic chamber being regulated in the manner described above. Thus, the sheet 104 serves to fluid-tightly close the space between the members 102 and 103 of the pneumatic means 100. The member 103 is stepped so as to have shoulders 105 and 106, and the shoulder 105 serves as an abutment for a flange 107 of the outer cylinder which surrounds the cylinder 113 of the shock absorber means 101. The shoulder 106 serves as an abutment for one end of a coil spring 108. The other end of the coil spring 108 engages a washer 109 which bears against a flexible membrane 110 whose outer peripheral portion is clamped between the flange 107 and the shoulder 105 in the manner indicated in FIG. 5. The inner periphery of the membrane 110 fluid-tightly surrounds and slidably engages the piston rod 111. This inner periphery of the membrane 110 slips with respect to the piston rod 111 in order to provide for volumetric changes in the hydraulic chamber of the expandable and compressible hydraulic means of the loading assembly. The piston rod 111 of the shock absorber means extends through the pneumatic chamber of the pneumatic means 100, is fixed to the upper wall of the housing 102, and beyond the latter is fixed to the body of the vehicle in any suitable way. The outer cylinder 112 defines with the inner cylinder 113 the elongated annular chamber 114 which communicates with the space between the upper wall of the cylinder 113 and the membrane 110. Within the cylinder 113 is located the cylinder chamber 115 beneath the piston which is fixed to the piston rod 111 and which slides within the cylinder 113. The upper inner portion of the outer cylinder 112 is threaded and receives an externally threaded ring 116 which engages a plurality of spaced blocks 117 which are located between the cylinder 113 and the fixing ring 116. A pair of spacer rings 118 and 119 are fixed to the exterior of the inner cylinder 113 and are formed with axial grooves extending therethrough, so that these spacer rings 118 and 119 serve to position the inner cylinder 113 coaxially within the outer cylinder 112 while allowing hydraulic liquid to flow freely along the chamber 114. Additional spacer blocks 120 are situated between the lower walls of the inner and outer cylinders 113 and 112, respectively, so that as a result of the spacer blocks and spacer rings the ring 116 is capable of fixing the cylinder 113 of the shock absorber within the outer cylinder 112 while at the same time hydraulic liquid can flow freely all around the inner cylinder 113 to communicate with the space beneath the membrane 110. A non-return valve 121 communicates with the cylinder chamber 115 for admitting fluid into the latter during an increase in the volume thereof. The top wall of the inner cylinder 113 carries a non-return damping valve 122 through which liquid can flow from the piston-rod chamber above the piston within the cylinder 113 into the space between the cylinder 113 and the membrane 110. A pair of additional non-return damping valves 124 and 123 are carried by the piston 125 in bores which pass therethrough so as to provide for flow of liquid between the piston-rod chamber and chamber 115 of the cylinder 113 in the manner described above, and of course the valves 122–124 have their springs suitably compressed during the initial assembly of the structure so as to provide for the desired damping action, while the spring of the valve 121 is relatively light to provide for immediate flow of hydraulic liquid into the chamber 115 during an increase in the volume thereof. The air which is under pressure within the pneumatic means 101 will of course act together with the spring 108 on the membrane 110 to maintain the hydraulic liquid at all times at the desired pressure. It should be noted that since the liquid pressure must balance the gas pressure plus the pressure of the spring 108, the liquid pressure is necessarily greater than the gas pressure, and thus at its face which is engaged by the liquid the membrane 110 is acted upon with a greater pressure than at its side which is directed toward the gas, and thus there is in this case also a pressure differential where the liquid pressure is greater than the gas pressure and serves to reliably maintain the membrane 110 in fluid-tight engagement with the piston rod 111 as well as with the inner cylindrical member 103.

The embodiment of FIG. 5 will operate in a manner similar to the above-described embodiments, except that in the case of FIG. 5 the inner and outer cylinders will not move one with respect to the other. Instead, it is the membrane 110 which shifts. During a decrease in the volume of the chamber 115, liquid will be displaced out of this chamber through the valve 124 into the piston-rod chamber, and the excess liquid which cannot be accommodated therein will flow through the valve 122 into the hydraulic chamber of the hydraulic expandable and compressible means, the latter being capable of expanding to accommodate the excess liquid which cannot be received in the space above the piston 125. On the other hand, when the volume of the chamber 115 increases, liquid will flow through the valve 123 into the chamber 115, and at the same time liquid will flow from the hydraulic chamber of the loading assembly through the valve 121 into the chamber 115 so as to prevent cavitation or foaming therein.

FIG. 6 illustrates an embodiment of the invention where the expandable and compressible hydraulic means of the loading assembly is completely housed within the expandable and compressible pneumatic means thereof. Thus, it will be seen that the expandable and compressible hydraulic means 220 of the loading assembly of FIG. 6 is housed in its entirety within the upper portion of the housing 221 of the pneumatic means of the loading assembly. The expandable and compressible pneumatic means of FIG. 6 includes a roll-sheet 222 which at its outer wall portion is in fluid-tight rolling engagement with the cylindrical portion of the housing 221, and at its inner wall portion, the roll-sheet 222 is in fluid-tight rolling engagement with the exterior surface of the cylinder 223 of the shock absorber means, this cylinder 223 being connected at its lower end, in any suitable way, to the axle of the vehicle. Thus, the embodiment of FIG. 6 does not require a special inner cylinder for support of the inner wall portion of the sheet 222. The piston rod 224 of the shock absorber means of FIG. 6 is hollow, and the hollow interior of the piston rod 224 communicates through a transverse passage 228, formed in the piston rod 224, with the interior of the hydraulic means 220. A coil spring 225 is housed within the housing 221 of the pneumatic means and engages an annular member 226′ which in turn engages the flexible wall 227 in which the hydraulic liquid of the hydraulic expandable and compressible means 220 is located. The bottom end of the spring 225 engages a ring 226 which is fixed to the outer periphery of the roll-sheet 222 and serves to maintain this outer periphery of the roll-sheet in a groove of the cylindrical wall 221, as indicated in FIG. 6. The flexible, liquid-impervious, and fluid-tight wall 227 of the hydraulic means of the loading assembly is closed at all sides. The inner peripheral portions of the flexible wall 227 are in fluid-tight sliding engagement with the exterior surface of the piston rod 224.

With the embodiment of FIG. 6, all of the non-return valves are carried directly by the piston 229 of the shock absorber means. Thus, the non-return valve means 230 communicates with the hollow piston rod 224 as well as with the lower cylinder chamber of the cylinder 223. The non-return, damping valve 231 permits fluid to flow from beneath the piston 229 to the upper side thereof during a decrease in the volume of the cylinder chamber beneath the piston 229. The spring-pressed non-return valve 233 communicates through a bore of the piston 229 also with the cylinder chamber beneath the piston 229, and it will be noted that this valve 233 also communicates with the hollow piston rod 224, so that during a reduction in the volume of the chamber beneath the piston 229, the liquid which cannot be accommodated in the piston-rod chamber will instead flow through the valve 233 into the expandable hydraulic means 220, which thus is capable of accommodating the excess liquid which cannot be displaced through the valve 231 into the piston-rod chamber of the cylinder 223. The spring-pressed non-return valve 232 permits fluid to flow through the piston 229 from the upper to the lower side thereof during an increase in the volume of the cylinder chamber beneath the piston 229.

The body of the vehicle is fixed in any suitable way to the piston rod 224, while the axle of the vehicle is fixed in any suitable way to the cylinder of the shock absorber means, as pointed out above. Furthermore, through a suitable control valve, as described above, the pressure of the air or other gas within the housing 221 is maintained at a desired value.

The valve which regulates the pressure of the gas within the housing 221 provides, according to the load of the vehicle, a certain gas pressure within the cylinder 221, and of course the pressure of the fluids of the entire assembly is such that it balances and is capable of supporting the load. The pressure within the housing 221 acts on the flexible housing 227 so that the pressure of the liquid in the hydraulic means 220 is determined by the pressure of the gas within the housing 221, and of course through the hollow piston rod 224, the pressure of the liquid within the shock absorber means is also influenced. Furthermore, it is to be noted that the pressure transmitted to the liquid from the gas in the housing 221 is increased by the pressure of the spring 225, so that in this way the liquid under pressure within the flexible housing 227 necessarily balances the air pressure plus the spring pressure of the spring 225, and thus the inner peripheral portions of the flexible housing 227 are pressed by the liquid therein against the piston rod with a force greater than can be derived from the gas in the housing 221, and in this way reliable pressure differential is maintained to reliably hold the inner peripheral portions of the housing 227 in fluid-tight engagement with the piston rod 224.

It is to be noted that the same principle applies, although through differential areas, with respect to the sealing ring 235. This sealing ring 235 carried by the upper wall of the cylinder 223 is located between the air in the housing 221 and the liquid in the cylinder 223, and the ring 235 has exposed to the gas an area which is far smaller than its area which is exposed to the liquid in the cylinder 223, so that this liquid acts with a far greater pressure on the sealing ring 235 to reliably maintain it in fluid-tight engagement with the piston rod 224 as well as with the upper wall of the cylinder 223.

Assuming that the cylinder chamber beneath the piston 229 decreases in volume, then the valve 231 will open in order to transfer the liquid to the piston-rod chamber, and also the valve 233 will open to accommodate any liquid which cannot be received in the chamber above the piston 229, so that under these conditions the volume of the hydraulic means 220 will increase as it automatically accommodate the excess liquid which cannot be displaced to the upper side of the piston 229. When the volume of the chamber beneath the piston 229 increases, liquid will flow through the valve 232 into the chamber beneath the piston 229, and at the same time the lightly spring-pressed valve 230 will immediately open to admit fluid from the hydraulic means 220 of the loading assembly into the chamber beneath the piston 229, so that with the embodiment of FIG. 6 it is also clear that cavitation and foaming of the liquid cannot occur anywhere within the cylinder 223.

It is to be noted, with respect to the sealing ring 235, that while it has an area exposed to the liquid in a cylinder 223 which is far greater than the area exposed to the air in the housing 221, the presence of the spring 225 also guarantees that the pressure of the liquid acting on the ring 235 is greater than that of the air which can reach the ring 235, inasmuch as the liquid pressure within the cylinder 223 must also equal the gas pressure plus the pressure of the spring 225.

The embodiment of the invention which is illustrated in FIG. 7 is similar to that of FIG. 6. However, it will be noted that with the embodiment of FIG. 7 the cylinder of the shock absorber means is longer and is provided with an additional chamber 141. Thus, with the embodiment of FIG. 7, the piston-rod chamber of the cylinder 140 of the shock absorber means is divided by a partition which surrounds the piston rod into a pair of subchambers 141 and 144. The piston rod 143 is hollow and through a bore 142 communicates with the subchamber 141. Thus, as a result of the communication between the chamber 141 with the interior of the hollow piston rod 143, this chamber 141 can communicate on the one hand with the chamber 144 and on the other hand through the hollow piston rod with the interior hydraulic chamber 145 of the hydraulic expandable and compressible means 146 of the loading assembly, this means 146 again being housed within the pneumatic expandable and compressible means 149 which is constructed in a manner described above in connection with FIG. 6. The partition which divides the piston-rod chamber of the cylinder 140 of the shock absorber means into the pair of subchambers 141 and 144 has a very slight clearance with the exterior of the piston rod 143 so as to provide the very narrow gap 147 which is at all times filled with liquid, thus providing for a very easy sliding between the piston rod and the partition, one with respect to the other. A sealing ring 148 is located at the upper wall of the cylinder 140 and is in fluid-tight engagement with the piston rod 143, this ring 148 being acted upon by the different fluids in a manner described above in connection with FIG. 6 so as to provide a reliable seal between the liquid and gas. Within the pneumatic means 149 of the loading assembly is located the spring 151 which acts in the same way as the spring 225 of FIG. 6, and thus the flexible wall 150 of the pneumatic expandable and compressible means 146 will be acted upon only by the gas pressure and the spring pressure to provide in the pneumatic chamber 145 a greater pressure than that in the pneumatic means 149 and thus maintain the desired seals, as described above.

The piston 152 of the shock absorber means is fixed to the lower end of the piston rod 143 and carries the various non-return valves 153–156, as indicated in FIG. 7.

The embodiment which is shown in FIG. 7 will operate in a manner very similar to the embodiment which is shown in FIG. 6. Thus, the non-return valve means 153 will very easily open in order to admit to the chamber beneath the piston 152 the excess fluid which cannot be derived from the chamber 144 so as to prevent cavitation and foaming beneath the piston 152 during an increase in the volume of the chamber beneath this piston, and during a decrease in the volume of the chamber beneath the piston 152 the valve 155 will automatically open to transmit liquid to the chamber 144, while the excess liquid which cannot be received in the chamber 144 will flow through the valve 156 along the interior of the hollow piston rod 143 into the hydraulic chamber 145 of the loading assembly. It should be noted that because of the presence of the narrow gap 147 the chamber 141 is substantially insulated from the different forces which are encountered in the chamber 144, and thus the sealing ring 148 is in this way insulated from pressure fluctuations which are encountered in the chamber 144.

FIG. 8 shows an embodiment of the invention where the cylinder 161 of the shock absorber means is also provided with a partition which divides the piston-rod chamber into a pair of subchambers 160 and 166, the partition also closely surrounding the piston rod 165 so as to define the narrow gap 173 which is at all times filled with liquid. The expandable and compressible pneumatic means 162 of the loading assembly is the same as that of FIG. 7. The cylinder 161 of the shock absorber means of FIG. 8 has a top wall 163 which is fixed with a downwardly directed cylindrical portion 164 which surrounds the piston rod. The cylindrical element 164 extends into the subchamber 160, and it will be noted that with the embodiment of FIG. 8 the piston rod 165 is not bored along the length required for the embodiment of FIG. 7. Instead the axial bore of the hollow piston rod 165 terminates in the subchamber 160. Thus, it is possible for the chamber 166 to communicate with the chamber 160 through the valve shown in FIG. 8 with the interior of the hollow piston rod 165. Moreover, the upper end 163 of the cylinder 161, this end 163 being fixed to the cylinder 161, is formed with a bore 167 passing therethrough so that the gas under pressure within the expandable and compressible pneumatic means 162 can communicate through the bore 167 freely with the space which surrounds the cylindrical extension 164 of the upper wall 163 of the cylinder 161. A sealing ring 168 is accommodated within the upper wall 163 of the cylinder 161 and is in fluid-tight sliding engagement with the piston rod 165.

An additional sealing ring 169 is arranged between the inner surface of the cylinder 161, in the chamber 160 thereof, and the outer surface of the cylindrical extension 164 of the top wall 163. The upper surface of the sealing ring 169 is fixed to a ring 170 which is acted upon by a spring 171 compressed between the ring 170 and the upper end 163 of the cylinder 161. Thus, the sealing ring 169 is capable of axially sliding with respect to the cylinder 161 and the extension 164, and it is acted upon at its upper side by the gas which is under pressure as well as by the spring 171, and at its lower side the annular shiftable member 169 is acted upon by the liquid which is under pressure within the shock absorber 161. As a result of the fact that the liquid which is under pressure must counteract the total of the pressures of the spring 171 and the gas pressure, the member 169 is acted upon by the liquid at a greater pressure than by the gas, and thus there is provided again the desired pressure differential which maintains the lips of the sealing member 169 in fluid-tight engagement with the inner surface of the cylinder 161 and the outer surface of the extension 164.

Thus, with the embodiment of FIG. 8, it is that portion of the chamber 160 which is beneath the shiftable member 169 which forms the expandable and compressible hydraulic means of the loading assembly, it will be noted that the expandable and compressible hydraulic means of the loading assembly is in this case accommodated directly within the cylinder 161 of the shock absorber means. Moreover, it will be seen that the chamber 172 above the shiftable member 169 is also located directly within the subchamber 160, and it is in this chamber 172 that the pneumatic pressure plus the spring pressure acts on the shiftable member 169. It is apparent that with the embodiment of FIG. 8, the above-described operations will also take place. Thus, during a decrease in the volume of the chamber beneath the piston of the shock absorber, liquid will flow into the chamber 166 and at the same time the excess liquid which cannot be accommodated in the chamber 166 will be received through the hollow piston rod in the space of the chamber 160 which is beneath the shiftable member 169, the latter yielding upwardly at this time so as to provide the possibility of accommodating the excess liquid which cannot be received in the piston-rod chamber just beneath the gap 173. On the other hand, during an increase in the volume of the chamber beneath the piston of the shock absorber not only will the lightly-spring-pressed non-return valve means immediately open to admit liquid from beneath the member 169 through the hollow piston rod into the chamber beneath the piston of the shock absorber, but in addition the second non-return valve carried by the piston will admit additional fluid from the chamber 166 to the lower side of the piston.

Figure 9:
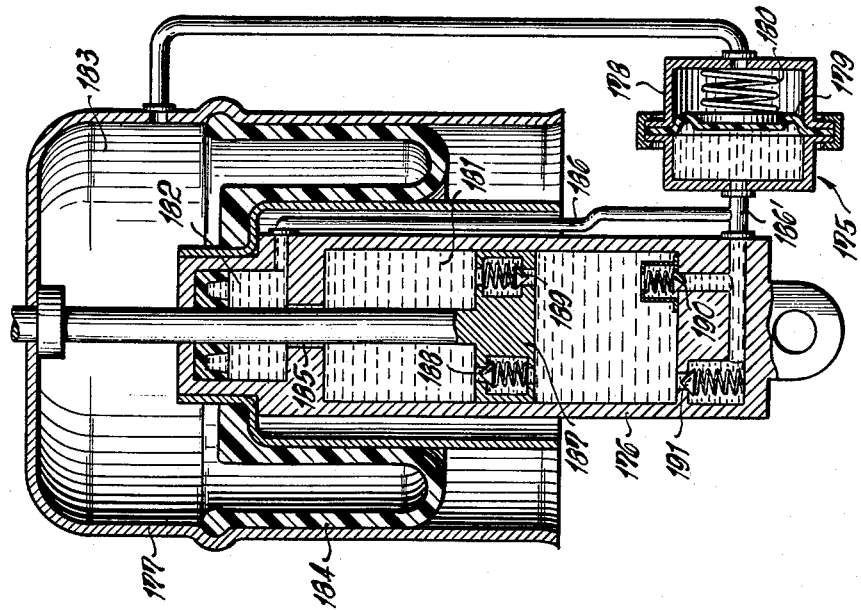
FIG. 9 is a diagrammatic sectional illustration of a suspension according to the invention, the loading assembly of the embodiment of the invention shown in FIG. 9 including a hydraulic chamber which is separate from the rest of the structure and can be located at any desired location.

The embodiment of the invention which is illustrated in FIG. 9 makes it possible to locate the expandable and compressible hydraulic means of the loading assembly at any desired part of the vehicle or the like. Thus, as may be seen from FIG. 9, the expandable and compressible hydraulic means 175 is in the form of a separate unit located outside of the pneumatic means of the loading assembly as well as outside of the shock absorber means. This hydraulic means 175 of the loading assembly includes a pair of housing parts 178 which are fixed to each other and which clamp therebetween the outer periphery of a flexible diaphragm or membrane 179 which is acted upon by a spring 180 in the manner shown in FIG. 9. The side of the membrane 179 which is acted upon by the spring 180 is filled with air or other gas and communicates through a suitable flexible conduit with the interior 183 of the expandable and compressible pneumatic means 177 of the loading assembly. The liquid-filled chamber on the other side of the membrane 179 communicates with the shock absorber means 176. The piston 187 of the shock absorber means divides the interior of the cylinder thereof into a piston-rod chamber 181 and a cylinder chamber located beneath the piston 187. Moreover, the piston-rod chamber 181 is divided by a partition of the cylinder of the shock absorber means 176 into a pair of subchambers, providing above the partition, which forms the gap 185 with the piston rod, the subchamber 182 in which is located the sealing ring which fluid-tightly engages the piston rod in the manner described above. Moreover, this subchamber 182 communicates through a conduit 186 with the conduit 186' leading to the liquid-filled chamber of the expandable and compressible means 175 of the loading assembly as well as to the non-return valves 190 and 191 and which communicate with the cylinder chamber beneath the piston 187. The subchamber 182 is separated by the sealing ring which engages the piston rod from the pneumatic chamber 183 of the expandable and compressible pneumatic means 177 of the loading assembly. This pneumatic means 177 includes the flexible roll-sheet 184 whose outer wall portion is in fluid-tight rolling engagement with the cylindrical wall of the housing of the pneumatic means 177 and whose inner wall portion is in fluid-tight rolling engagement with an inner cylindrical member which is fixed to the upper portion of the cylinder of the shock absorber 176, so that with this embodiment also a substantial part of the shock absorber means is surrounded by the pneumatic means to be protected thereby, as described above. Thus, the chamber 182 is separated by the gap 185 from the chamber beneath the partition which defines the gap 185 with the exterior of the piston rod. The piston 187 carries a pair of oppositely directed spring-pressed non-return valves 188 and 189. The non-return valve means 190 is very lightly pressed against its valve seat so that liquid will very quickly and easily flow through the non-return valve 190 into the lower cylinder chamber when the volume thereof increases, as described above.

During a decrease in the volume of the chamber beneath the piston 187, liquid will flow through the valve 189 into the piston-rod chamber 181, and the excess liquid which cannot be received in the piston-rod chamber will flow through the non-return valve 191 and the conduit 186' into the expandable and compressible hydraulic means 175 of the loading assembly, the spring 180 becoming further compressed as the membrane 179 is displaced to the right, as viewed in FIG. 9, increasing the volume of the liquid-filled chamber of the means 175 so that it is capable of receiving the excess liquid which cannot be received by the piston-rod chamber 181. During an increase in the volume of the chamber beneath the piston 187, liquid will flow from the piston-rod chamber 181 through the valve 188 to the chamber beneath the piston 187, and the additional liquid will immediately flow from the liquid-filled portion of the expandable and compressible means 175 through the valve 190 into the chamber beneath the piston 187, so that with the embodiment of FIG. 9 there will also be no possibility of foaming or cavitation in the hydraulic liquid. With the structure of FIG. 9 it is possible to locate the unit 175 at any desired part of the vehicle. It is to be noted that the sealing ring which engages the piston rod of the embodiment of FIG. 9 is maintained through the conduit 186 at the pressure of the hydraulic liquid, so that a reliable seal between the sealing ring and the piston rod is maintained.

Figure 10:
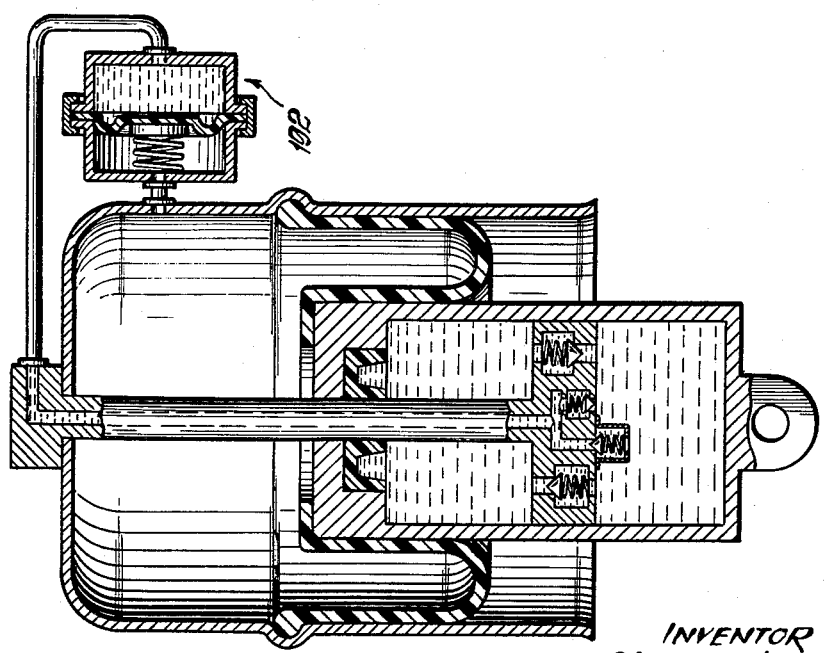
FIG. 10 shows an arrangement similar to that of FIG. 9 but where the separate hydraulic chamber of the loading assembly is connected to the remaining structure in a manner different from FIG. 9.

FIG. 10 shows an embodiment similar to that of FIG. 9, but showing a different manner of connecting the separate expandable and compressible hydraulic means of the loading assembly to the remaining structure. Thus, with the embodiment of FIG. 10, the piston of the shock absorber means carries valves in a manner similar to that shown in FIGS. 7 and 8, and in addition this piston of course has a hollow piston rod, this hollow piston rod communicating through a suitable flexible conduit with the liquid-filled chamber of the unit 192 which is identical with the unit 175 described above. The air-filled chamber of the unit 192 communicates directly with the gas-filled chamber of the pneumatic expandable and compressible means, in the same way as described above in connection with FIG. 9. Thus, the embodiment of FIG. 10 will operate in the same way as the embodiment of FIG. 9, except that in the case of the embodiment of FIG. 10 the unit 192 communicates with the stationary piston rod and housing of the pneumatic means of the loading assembly, and thus the unit 192 is not connected to elements which are movable one with respect to the other, as is the case with FIG. 9 where the outer housing of the pneumatic means 177 and the cylinder of the shock absorber means are of course axially shiftable one with respect to the other.

FIGS. 11 and 12 illustrate different embodiments of valve arrangements which may be used with the above-described embodiments of the invention.

In the embodiment of FIG. 11 the piston of the shock absorber means is provided with a pair of oppositely directed non-return, spring-pressed damping valves 196 and 197, while the top wall of the cylinder of the shock absorber carries the spring-pressed, non-return, damping valve 195. The bottom wall of the shock absorber cylinder carries the lightly spring-pressed non-return valve means 198 which admits fluid into the lower cylinder chamber in the manner described above. It will be noted that the valve arrangement of FIG. 11 corresponds substantially to that of FIG. 3. Thus, the valve arrangement of FIG. 11 will operate in the manner described in connection with FIG. 3, and the particular feature which is to be noted is that during movement of the cylinder and piston of the shock absorber means in a direction which decreases the volume of the chamber beneath the piston of the shock absorber the excess fluid will be displaced through the valve 195 to the hydraulic chamber of the hydraulic expandable and compressible means of the loading assembly, while during an increase in the volume of the chamber beneath the piston of the shock absorber the fluid will be drawn into this latter chamber through the non-return valve means 198, so that with this construction there is a continuous circulation of the hydraulic liquid during reciprocation of the cylinder and piston one with respect to the other, and thus a very efficient cooling of the hydraulic liquid is obtained. It will be noted that this same type of circulation of the hydraulic liquid will be provided with the embodiments of FIGS. 1, 2, 4, and 5, as well as with the embodiment of FIG. 3, inasmuch as in all of these embodiments liquid can only move out through the valve at the upper wall of the cylinder of the shock absorber and can only enter back into the cylinder through the non-return valve means at the lower wall thereof. In the embodiments of FIGS. 6–10, such circulation of the hydraulic liquid is not provided.

The circulation of the hydraulic liquid which is thus provided with embodiments of the type shown in FIGS. 1–5 can be further improved with a valve arrangement as shown in FIG. 12. In this case the non-return valve 200 at the top wall of the cylinder of the shock absorber admits the hydraulic liquid into the piston-rod chamber of the cylinder. The non-return valve means 201 is located at the bottom wall of the shock absorber cylinder to admit fluid into the cylinder chamber beneath the piston when the volume of this latter chamber increases. With the embodiment of FIG. 12, however, there is a spring-pressed non-return damping valve 202 through which fluid leaves the cylinder chamber beneath the piston during a decrease in the volume of this latter chamber, and the piston itself in this embodiment carries a single spring-pressed non-return damping valve 203 permitting fluid to flow only from the piston-rod chamber to the chamber beneath the piston during an increase in the volume of this latter chamber, and with this embodiment it will not be possible for liquid to flow through the piston from the chamber beneath the piston to the piston-rod chamber above the piston, as with the other embodiments described above.

Thus, with an arrangement as shown in FIG. 12, when there is a decrease in the volume of the cylinder chamber beneath the piston of the shock absorber, all of the liquid displaced out of this latter chamber must flow through the valve 202 and thus through the expandable and compressible hydraulic means of the loading assembly, and of course the greater part of this liquid will flow through the valve 200 into the piston-rod chamber. During an increase in the volume of the cylinder chamber beneath the piston of the shock absorber, liquid will be capable of flowing through the piston, the valve 203 opening automatically at this time, so that the liquid can flow directly from the piston-rod chamber to the chamber at the lower side of the piston, and at the same time the valve 201 will automatically open to receive hydraulic fluid from the expandable and compressible hydraulic means of the loading assembly, as described above, so that the structure of FIG. 12 will produce the same results as the structure described above. The arrows 204 and 205 diagrammatically indicate by their size the amounts of hydraulic liquid which respectively flow upwardly and downwardly in the elongated annular chamber surrounding the cylinder of the shock absorber with the embodiment of FIG. 12. It is thus apparent that a far greater part of the liquid flows upwardly around the cylinder of the shock absorber, as indicated by the arrow 204, than flows downwardly, as indicated by the arrow 205, so that in the manner of a pilgrim-step operation, the hydraulic liquid is circulated with the major portion of the heated liquid flowing upwardly along the space which surrounds the cylinder of the shock absorber, to provide a highly efficient cooling of the liquid. Thus, since the heated liquid flows from a lower to an upper part of the assembly, and is capable of being surrounded by a structure such as the ribbed cylinder of FIG. 2, it is possible to provide a very effective cooling of the liquid with an arrangement as shown in FIG. 12.

Of course, it is also possible, if desired, to provide the embodiments of FIGS. 6–10 with valve arrangements similar to those shown in FIGS. 11 and 12.

It will be understood that each of the elements described above, or two or more together, may also find a useful application in other types of suspensions differing from the types described above.

While the invention has been illustrated and described as embodied in hydraulic suspensions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a suspension for vehicles or the like, in combination, hydraulic shock absorber means including a cylinder and a piston slidable therein and having a pair of opposed faces one of which has a larger effective area than the other and said piston dividing the interior of said cylinder into a pair of chambers one of which is defined in part by said face of said piston which is of larger effective area; non-return valve means communicating with said one chamber of said cylinder for admitting hydraulic liquid into said one chamber during an increase in the volume thereof while preventing liquid from discharging through said non-return valve means during a decrease in the volume of said one chamber of said cylinder; and a loading assembly operatively connected to said shock absorber means for transferring thereto the load which is carried by the suspension, said loading assembly including expandable and compressible means defining a hydraulic chamber which is capable of changing its volume, completely filled with liquid, maintained at all times out of communication with gas, maintained under pressure by the loading assembly, and communicates with said non-return valve means for directing liquid through the latter from said expandable and compressible means into said one chamber of said cylinder during an increase in the volume of said one chamber so as to prevent cavitation therein, said expandable and compressible means surrounding said cylinder.

2. In a suspension for vehicles or the like, in combination, hydraulic shock absorber means including a cylinder and a piston slidable therein and having a pair of opposed faces one of which has a larger effective area than the other and said piston dividing the interior of said cylinder into a pair of chambers one of which is defined in part by said face of said piston which is of larger effective area; non-return valve means communicating with said one chamber of said cylinder for admitting hydraulic liquid into said one chamber during an increase in the volume thereof while preventing liquid from discharging through said non-return valve means during a decrease in the volume of said one chamber of said cylinder; and a loading assembly operatively connected to said shock absorber means for transferring thereto the load which is carried by the suspension, said loading assembly including expandable and compressible means defining a hydraulic chamber which is capable of changing its volume, completely filled with liquid, maintained at all times out of communication with gas, maintained under pressure by the loading assembly, and communicates with said non-return valve means for directing liquid through the latter from said expandable and compressible means into said one chamber of said cylinder during an increase in the volume of said one chamber so as to prevent cavitation therein, said expandable and compressible means surrounding said cylinder and being defined in part by the exterior of said cylinder.

3. In a suspension for vehicles or the like, in combination, hydraulic shock absorber means including a cylinder and a piston slidable therein and having a pair of opposed faces one of which has a larger effective area than the other and said piston dividing the interior of said cylinder into a pair of chambers one of which is defined in part by said face of said piston which is of larger effective area; non-return valve means communicating with said one chamber of said cylinder for admitting hydraulic liquid into said one chamber during an increase in the volume thereof while preventing liquid from discharging through said non-return valve means during a decrease in the volume of said one chamber of said cylinder; and a loading assembly operatively connected to said shock absorber means for transferring thereto the load which is carried by the suspension, said loading assembly including expandable and compressible means defining a hydraulic chamber which is capable of changing its volume, completely filled with liquid, maintained at all times out of communication with gas, maintained under pressure by the loading assembly, and communicates with said non-return valve means for directing liquid through the latter from said expandable and compressible means into said one chamber of said cylinder during an increase in the volume of said one chamber so as to prevent cavitation therein, said expandable and compressible means surrounding said cylinder and including an outer wall formed at its exterior with cooling ribs so that heat in the liquid in the chamber formed by said expandable and compressible means will be dissipated through said wall and said ribs thereof to the outer atmosphere.

4. In a suspension for vehicles or the like, in combination, hydraulic shock absorber means including a cylinder and a piston slidable therein and having a pair of opposed faces one of which is of a larger effective area than the other, said piston dividing the interior of said cylinder into a pair of chambers one of which is defined in part by said face of said piston which is of larger effective area; non-return valve means communicating with said one chamber of said cylinder for admitting liquid into the same but preventing liquid from flowing out of the same; a loading assembly operatively connected to said shock absorber means for transferring thereto the load which is to be supported by the suspension, said loading assembly including an expandable and compressible means defining a chamber which is capable of changing its volume, completely filled with liquid, maintained at all times out of communication with gas, maintained under pressure by the loading assembly, and communicates through said non-return valve means with said one chamber of said cylinder so that hydraulic liquid will flow into said one chamber during an increase in the volume thereof so as to prevent cavitation in said one chamber of said cylinder, said expandable and compressible means including a wall surrounding said cylinder and defining part of said chamber of said expandable and compressible means, and said shock absorber means including additional valves cooperating with said cylinder for directing liquid out of said cylinder, through said chamber of said expandable and compressible means, and back into said cylinder during movement of said piston and said cylinder in one direction, one with respect to the other, so that at least during movement of said piston and cylinder with respect to each other in said one direction the hydraulic liquid is circulated.

5. In a suspension for vehicles or the like, in combination, hydraulic shock absorber means including a cylinder and a piston slidable therein and having a pair of opposed faces one of which is of a larger effective area than the other, said piston dividing the interior of the cylinder into a pair of chambers one of which is defined in part by the face of the piston which is of larger effective area; and a loading assembly operatively connected to said shock absorber means for transferring thereto the load which is supported by the suspension, said loading assembly including pneumatic expandable and compressible means defining a pneumatic chamber and hydraulic expandable and compressible means defining a hydraulic chamber, both of said chambers being maintained under pressure by the loading assembly and said pneumatic chamber being located over and connected to said shock absorber means and including an annular flexible roll-sheet having an inner wall portion adjacent the cylinder and said pneumatic expandable and compressible means including a wall surrounding a substantial portion of said cylinder at the upper part thereof and on which said sheet rolls during change in the volume of said pneumatic chamber; and non-return valve means communicating with said one cylinder chamber and with said hydraulic chamber for admitting fluid from said hydraulic chamber into said one cylinder chamber during an increase in the volume of the latter to prevent cavitation therein.

6. In a suspension for vehicles or the like, in combination, hydraulic shock absorber means including a cylinder, a piston slidable therein, and a piston rod fixed to said piston and extending therefrom through an end wall of said cylinder, said piston defining in the cylinder a chamber on that side of the piston which is opposite from the piston rod; non-return valve means communicating with said cylinder chamber for admitting fluid into the same and preventing fluid from flowing out of said cylinder chamber; and a loading assembly including a pneumatic expandable and compressible means defining a pneumatic chamber and a hydraulic expandable and compressible means defining a hydraulic chamber, both of said chambers being maintained under pressure by the loading assembly and said hydraulic chamber communicating with said cylinder chamber through said non-return valve means to deliver liquid thereto during an increase in the volume of said chamber for preventing caviation in said cylinder chamber, said pneumatic chamber being operatively connected to said cylinder and said piston rod extending through said pneumatic chamber; and a sealing means surrounding said piston rod and located between said pneumatic chamber and the liquid in said cylinder, the gas in said pneumatic chamber and the liquid in said cylinder forming a pair of fluids which are respectively at different pressures providing a differential pressure acting on said sealing means for maintaining the latter in fluid-tight engagement with said piston rod.

7. In a suspension for vehicles or the like, in combination, shock absorber means including a cylinder and a piston slidable therein, a piston rod connected to and extending from one side of said piston through an end wall of said cylinder and said piston defining with said cylinder a cylinder chamber on the side of said piston opposite from said piston rod; non-return valve means communicating with said cylinder chamber for admitting fluid into the same during an increase in the volume thereof and preventing fluid from escaping through said non-return valve means out of said cylinder chamber during a decrease in the volume thereof; and a loading assembly operatively connected to said shock absorber means for transferring thereto the load which is carried by the suspension, said loading assembly including a pneumatic expandable and compressible means defining a pneumatic chamber and a hydraulic expandable and compressible means defining a hydraulic chamber, both of said chambers being maintained under pressure by the loading assembly and said hydraulic chamber communicating through said non-return valve means with said cylinder chamber for delivering liquid thereto during an increase in the volume thereof to prevent cavitation therein, said loading assembly further including a sealing member surrounding and engaging said piston rod and located between said hydraulic and pneumatic chambers and presenting to said hydraulic chamber a greater area than to said pneumatic chamber so as to be acted upon by the pressure of the liquid in said hydraulic chamber of said loading assembly to be maintained in fluid-tight engagement with said piston rod.

8. In a suspension for vehicles or the like, in combination, shock absorber means including a cylinder and a piston slidable therein, and a piston rod fixed to and extending from one side of the piston through an end wall of said cylinder, said piston defining with said cylinder a cylinder chamber on the side of said piston opposite from said piston rod; non-return valve means communicating with said cylinder chamber for admitting fluid into the same during an increase in the volume thereof; and a loading assembly operatively connected to said shock absorber means for transferring thereto the load which is supported by the suspension, said loading assembly including pneumatic expandable and compressible means defining a pneumatic chamber and hydraulic expandable and compressible means defining a hydraulic chamber, both of said chambers being maintained under pressure by the loading assembly and said hydraulic chamber communicating through said non-return valve means with said cylinder chamber to deliver the liquid thereto during an increase in the volume thereof to prevent cavitation therein, said loading assembly including a sealing member surrounding and engaging said piston rod and located between said pneumatic and hydraulic chambers and acted upon by the fluids in said pneumatic and hydraulic chambers, said fluids acting with different pressures on said sealing member for maintaining the latter with the pressure differential in fluid-tight engagement with the piston rod.

9. In a suspension for vehicles or the like, in combination, shock absorber means including a cylinder and a piston slidable therein and having opposed faces one of which is of a larger effective area than the other, said piston face of larger effective area defining with said cylinder a cylinder chamber located on one side of said piston; non-return valve means communicating with said cylinder chamber for delivery fluid into the same during an increase in the volume thereof; and a loading assembly operatively connected to said shock absorber means for transferring thereto the load which is supported by the suspension, said loading assembly including hydraulic expandable and compressible means defining a hydraulic chamber which is capable of changing its volume, is completely filled with liquid, is maintained at all times out of communication with gas, is maintained under pressure by the loading assembly, and communicates through said non-return valve means with said cylinder chamber for delivering liquid thereto during an increase in the volume thereof to prevent cavitation therein, said loading assembly being arranged in its entirety coaxially with respect to said shock absorber means.

10. In a suspension for vehicles or the like, in combination, hydraulic shock absorber means including a cylinder and a piston slidable therein and having a pair of opposed faces one of which is of a larger effective area than the other, said piston face of larger effective area defining with said cylinder a cylinder chamber; non-return valve means communicating with said cylinder chamber for delivering liquid thereto during an increase in the volume thereof; and a loading assembly operatively connected to said shock absorber means for delivering thereto the load which is supported by the suspension, said loading assembly including a hydraulic expandable and compressible means defining a hydraulic chamber which communicates through said non-return valve means with said cylinder chamber for delivering liquid thereto during an increase in the volume thereof so as to prevent cavitation therein, said hydraulic chamber being maintained under pressure by said loading assembly and including a wall member, a shiftable member, and a yieldable member located between and fixed to said wall member and said shiftable member.

References Cited by the Examiner

UNITED STATES PATENTS

| 2,294,918 | 9/42 | Levy | 267—64 X |
| 2,984,476 | 5/61 | Turner | 267—65 |
| 3,036,844 | 5/62 | Vogel | 267—64 X |

FOREIGN PATENTS

| 217,855 | 2/57 | Australia. |
| 1,163,619 | 9/58 | France. |
| 869,132 | 5/61 | Great Britain. |

ARTHUR L. LA POINT, *Primary Examiner.*